(12) United States Patent
He et al.

(10) Patent No.: US 9,076,073 B2
(45) Date of Patent: Jul. 7, 2015

(54) PHOTOGRAPHING METHOD, PHOTO MANAGEMENT METHOD AND DEVICE

(71) Applicant: Huawei Technologies Co., Ltd., Shenzhen (CN)

(72) Inventors: Zhen He, Shenzhen (CN); Jilin Liu, Shenzhen (CN); Tengyue Li, Shenzhen (CN); Maosheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/496,221

(22) Filed: Sep. 25, 2014

(65) Prior Publication Data

US 2015/0010239 A1    Jan. 8, 2015

Related U.S. Application Data

(63) Continuation of application No. PCT/CN2014/070882, filed on Jan. 20, 2014.

(30) Foreign Application Priority Data

Jun. 6, 2013    (CN) .......................... 2013 1 0222511

(51) Int. Cl.
*G06K 9/62*    (2006.01)
*G06K 9/00*    (2006.01)

(52) U.S. Cl.
CPC .......... *G06K 9/6202* (2013.01); *G06K 9/00664* (2013.01); *G06K 9/6267* (2013.01)

(58) Field of Classification Search
None
See application file for complete search history.

(56) References Cited

U.S. PATENT DOCUMENTS 5,357,308 A    10/1994    Goo
6,307,544 B1 *  10/2001    Harding ........................ 715/709

(Continued)

FOREIGN PATENT DOCUMENTS

CN    1061446 A    5/1992
CN    1964434 A    5/2007

(Continued)

OTHER PUBLICATIONS

Partial English Translation and Abstract of Chinese Patent Application No. CN1964434A, Nov. 14, 2014, 9 pages.
Partial English Translation and Abstract of Chinese Patent Application No. CN102082864A, Nov. 17, 2014, 5 pages.

(Continued)

*Primary Examiner* — Tsung-Yin Tsai
(74) *Attorney, Agent, or Firm* — Conley Rose, P.C.; Grant Rodolph

(57) ABSTRACT

A photographing method that includes: acquiring to-be-photographed first content; after determining a first subject with which a user is concerned in the first content, acquiring an image composition relationship between a second subject in the first content and the first subject, where the second subject is another background subject in the first content except the first subject; matching the image composition relationship between the second subject and the first subject with a preset image composition template to obtain a matching evaluation degree, and providing an image composition adjustment suggestion on the first content for the user according to the matching evaluation degree and the image composition template, where the adjustment suggestion is a tip on how to adjust the image composition relationship in the first content so that the image composition relationship completely matches the preset image composition template.

17 Claims, 12 Drawing Sheets

(56) References Cited

U.S. PATENT DOCUMENTS

| | | | |
|---|---|---|---|
| 6,608,650 B1 * | 8/2003 | Torres et al. | 348/333.02 |
| 7,228,151 B2 | 6/2007 | Kota et al. | |
| 7,239,350 B2 * | 7/2007 | Ban | 348/333.02 |
| 7,317,485 B1 * | 1/2008 | Miyake et al. | 348/333.02 |
| 2011/0026835 A1 * | 2/2011 | Ptucha et al. | 382/209 |
| 2011/0087674 A1 | 4/2011 | Schokking et al. | |
| 2012/0013759 A1 | 1/2012 | Chen et al. | |
| 2012/0098992 A1 | 4/2012 | Hosoe | |
| 2014/0253592 A1 * | 9/2014 | Cho | 345/633 |

FOREIGN PATENT DOCUMENTS

| | | |
|---|---|---|
| CN | 101193206 A | 6/2008 |
| CN | 101216883 A | 7/2008 |
| CN | 100505833 C | 6/2009 |
| CN | 101562699 A | 10/2009 |
| CN | 101840146 A | 9/2010 |
| CN | 101945202 A | 1/2011 |
| CN | 102014248 A | 4/2011 |
| CN | 102033958 A | 4/2011 |
| CN | 102063709 A | 5/2011 |
| CN | 102082864 A | 6/2011 |
| CN | 102333176 A | 1/2012 |
| CN | 102457664 A | 5/2012 |
| EP | 0411906 A3 | 7/1990 |
| EP | 1427190 A1 | 6/2004 |
| EP | 1603328 A3 | 12/2009 |

OTHER PUBLICATIONS

Partial English Translation and Abstract of Chinese Patent Application No. CN101945202A, Nov. 17, 2014, 7 pages.
Partial English Translation and Abstract of Chinese Patent Application No. CN101840146A, Nov. 17, 2014, 11 pages.
Partial English Translation and Abstract of Chinese Patent Application No. CN102063709A, Nov. 14, 2014, 4 pages.
Partial English Translation and Abstract of Chinese Patent Application No. CN102014248A, Nov. 14, 2014, 17 pages.
Partial English Translation and Abstract of Chinese Patent Application No. CN101562699A, Nov. 14, 2014, 6 pages.
Partial English Translation and Abstract of Chinese Patent Application No. CN101216883A, Nov. 14, 2014, 30 pages.
Partial English Translation and Abstract of Chinese Patent Application No. CN101193206A, Sep. 9, 2014, 4 pages.
Chen, G., et al., "LifeLog—Action Life and Portable Travel Recorder cum photo information analysis system," Works Report, Apr. 1, 2013, 11 pages.
English Translation of Chen, G., et al., "LifeLog—Action Life and Portable Travel Recorder cum photo information analysis system," Works Report, Apr. 1, 2013, 10 pages.
Foreign Communication From A Counterpart Application, PCT Application No. CN/2014/070882, International Search Report dated Mar. 31, 2014, 7 pages.
Foreign Communication From A Counterpart Application, PCT Application No. CN/2014/070882, Written Opinion dated Apr. 23, 2014, 6 pages.

\* cited by examiner

PHOTOGRAPHING METHOD, PHOTO MANAGEMENT METHOD AND DEVICE

CROSS-REFERENCE TO RELATED APPLICATIONS

This application is a continuation of International Application No. PCT/CN2014/070882, filed on Jan. 20, 2014, which claims priority to Chinese Patent Application No. 201310222511.3, filed on Jun. 6, 2013, both of which are hereby incorporated by reference in their entireties.

TECHNICAL FIELD

Embodiments of the present invention relate to communications technologies, and in particular, to a photographing method, and a photo management method and device.

BACKGROUND

Currently, with increasingly high requirements for photography, a user more hopes to capture each classic moment, and hopes that a photo taken by the user is more professional. However, a nonprofessional person often cannot take a professional photo, and therefore, cannot well capture a wonderful moment.

With the development of smart cameras, the smart cameras have scene modes that switch automatically, for example, a smart camera detects a corresponding scene, and sets parameters correspondingly. For example, the scene modes include a portrait mode, a landscape mode, a macro mode, a sports mode, and the like. When a smart camera is used for photographing a landscape, after detection by a sensor in the smart camera, a mode with parameter settings most suitable for photographing the landscape can be automatically switched to the landscape mode; when a lens of the smart camera is close to a subject to be photographed, the mode can be automatically switched to the macro mode, thereby implementing focusing a close subject for photographing. When the smart camera photographs a moving subject, the mode is switched to the sports mode, and a shutter speed increases. This technology meets requirements of users for several most commonly used scenes, and parameters in some modes with automatic settings also make a photo better.

However, the foregoing smart camera cannot help the user with framing or image composition, that is, in a current photographing process, image composition quality of a to-be-taken photo cannot be determined or adjusted, which results in a poor photographing result.

In addition, there are many photos in the current smart camera, of which some are taken with a good effect, and some are taken with a poor effect. The current smart camera cannot automatically manage the photos, and instead the user has to view each photo in person, select and delete a photo taken with a poor effect, and sort through photos taken with a similar effect.

SUMMARY

In view of this, embodiments of the present invention provide a photographing method, and a photo management method and device, which are used to solve the problem in the prior art that in a photographing process, image composition quality of photographing cannot be determined or adjusted, which results in a poor photographing result; and in addition, further solve the problem in the prior art that a smart camera cannot automatically manage a photo.

According to a first aspect, an embodiment of the present invention provides a photographing method, which includes: acquiring to-be-photographed first content; after determining a first subject with which a user is concerned in the first content, acquiring an image composition relationship between a second subject in the first content and the first subject, where the second subject is a background subject in the first content except the first subject; matching the image composition relationship between the second subject and the first subject with a preset image composition template to obtain a matching evaluation degree; and providing an image composition adjustment suggestion on the first content for the user according to the matching evaluation degree and the preset image composition template, where the adjustment suggestion is a tip on how to adjust the image composition relationship in the first content, so that the image composition relationship completely matches the preset image composition template, where the matching evaluation degree is used to indicate properness of the image composition relationship.

With reference to the first aspect, in a first optional implementation manner, before the step of after determining a first subject with which a user is concerned in the first content, acquiring an image composition relationship between a second subject in the first content and the first subject, the method further includes selecting, by the user, the first subject of concern in the first content.

With reference to the first aspect, in a second optional implementation manner, before the step of acquiring an image composition relationship between a second subject in the first content and the first subject, the method further includes recognizing the first subject according to subject images in a preset subject image library; and correspondingly, before the step of matching the image composition relationship between the second subject and the first subject with a preset image composition template, the method further includes searching, according to the recognized first subject, an image composition template library for an image composition template corresponding to the first subject, and using the found image composition template corresponding to the first subject as the preset image composition template.

With reference to the first aspect, in a third optional implementation manner, the preset image composition template is a golden section template, a compact template, a triangular image composition template, a diagonal image composition template, a vertical line image composition template, or a horizontal line image composition template.

According to a second aspect, an embodiment of the present invention provides a photographing device, which includes: a first acquiring unit configured to acquire to-be-photographed first content; a second acquiring unit configured to, after the first acquiring unit acquires the first content, and after a first subject with which a user is concerned in the first content is determined, acquire an image composition relationship between a second subject in the first content and the first subject, where the second subject is a background subject in the first content except the first subject; a matching unit configured to, after the second acquiring unit acquires the image composition relationship, match the image composition relationship between the second subject and the first subject with a preset image composition template to obtain a matching evaluation degree; and an image composition adjustment suggestion obtaining unit configured to, after the matching unit obtains the matching evaluation degree, provide an image composition adjustment suggestion on the first content for the user according to the matching evaluation degree and the preset image composition template, where the adjustment suggestion is a tip on how to adjust the image composition relationship in the first content, so that the image composition relationship completely matches the preset image composition template, and the matching evaluation degree is used to indicate properness of the image composition relationship.

With reference to the second aspect, in a first optional implementation manner, the photographing device further includes: a first subject selection unit configured to, after the first acquiring unit acquires the first content, select, by the user, the first subject of concern in the first content.

With reference to the second aspect, in a second optional implementation manner, the photographing device further includes: a recognition unit configured to, after the first acquiring unit acquires the first content, and after a first subject with which the user is concerned in the first content is determined, recognize the first subject according to subject images in a preset subject image library; and an image composition template selection unit configured to, after the recognition unit recognizes the first subject, search, according to the recognized first subject, an image composition template library for an image composition template corresponding to the first subject, and use the found image composition template corresponding to the first subject as the preset image composition template.

According to a third aspect, an embodiment of the present invention further provides a photo management method, which includes: selecting a to-be-evaluated photo, and obtaining a main subject and a background subject of the photo according to a focal point of the photo; determining an image composition relationship between the main subject and the background subject; matching the image composition relationship between the main subject and the background subject with a preset image composition template to obtain a matching evaluation degree; and classifying the photo according to the matching evaluation degree, where the matching evaluation degree is used to indicate properness of the image composition relationship.

With reference to the third aspect, in a first optional implementation manner, the preset image composition template is a golden section template, a compact template, a triangular image composition template, a diagonal image composition template, a vertical line image composition template, or a horizontal line image composition template.

According to a fourth aspect, an embodiment of the present invention provides a photo management apparatus, which includes: a selection unit configured to select a to-be-evaluated photo, and obtain a main subject and a background subject of the photo according to a focal point of the photo; a determining unit configured to, after the selection unit obtains the main subject, determine an image composition relationship between the main subject and the background subject; a matching unit configured to, after the determining unit determines the image composition relationship, match the image composition relationship between the main subject and the background subject with a preset image composition template to obtain a matching evaluation degree; and a classification unit configured to, after the matching unit obtains the matching evaluation degree, classify the photo according to the matching evaluation degree, where the matching evaluation degree is used to indicate properness of the image composition relationship.

As can be learned from the foregoing technical solutions, in a photographing method, and a photo management method and device in the embodiments of the present invention, a first subject with which a user is concerned is determined in to-be-photographed first content to obtain an image composition relationship between the first subject and a second subject in the first content, further, the image composition relationship is matched with a preset image composition template to obtain a matching evaluation degree, and further, an image composition adjustment suggestion on the first content is provided for the user according to the matching evaluation degree, so as to solve the problem in the prior art that in a photographing process, image composition quality of photographing cannot be determined or adjusted, which results in a poor photographing result; in addition, and further solve the problem in the prior art that a smart camera cannot automatically manage a photo.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following clearly describes the technical solutions of the present invention with reference to the accompanying drawings in the embodiments of the present invention. The described embodiments are a part of the embodiments of the present invention. Based on the embodiments of the present invention, a person of ordinary skill in the art can obtain other embodiments which can solve the technical problem of the present invention and implement the technical effect of the present invention by equivalently altering a part of or all the technical features even without creative efforts. The embodiments obtained through alteration do not depart from the scope disclosed in the present invention.

An embodiment of the present invention provides a photographing method, where the photographing method is capable of image composition quality analysis and evaluation, and enables a user to automatically adjust image composition and a layout according to an image composition analysis suggestion.

First Embodiment

Figure 1:
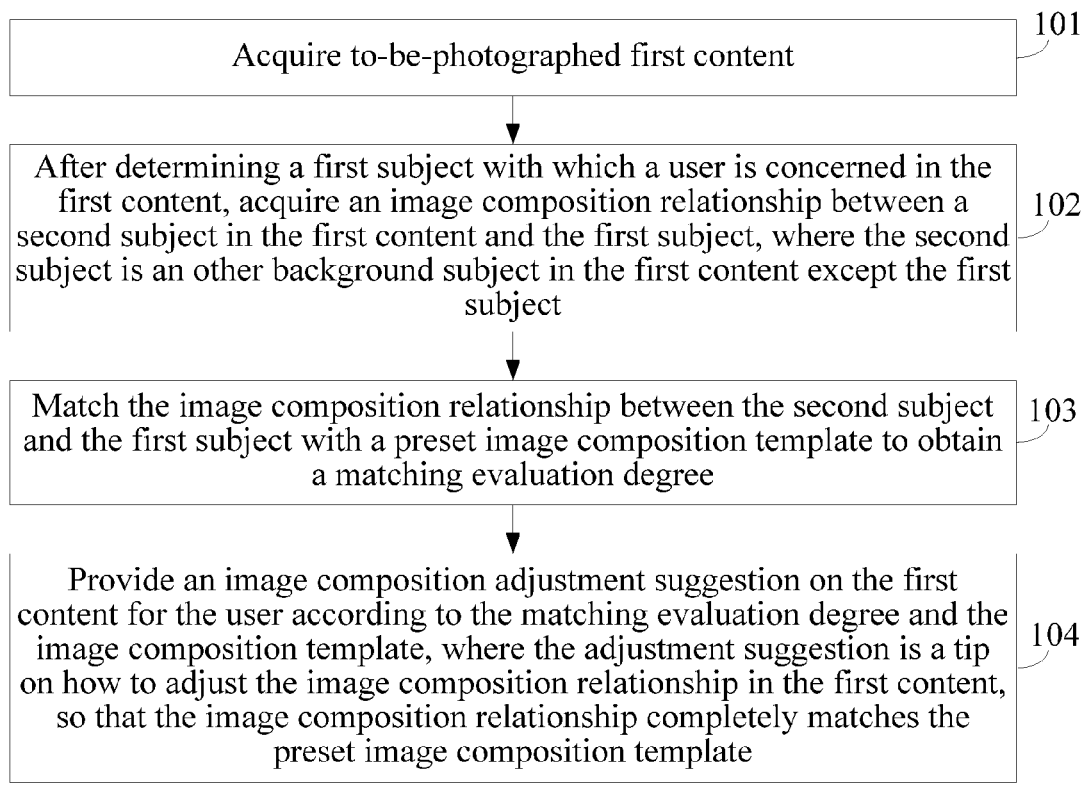
FIG. 1 is a schematic flowchart of a photographing method according to an embodiment of the present invention.

FIG. 1 shows a photographing method according to an embodiment of the present invention. As shown in FIG. 1, the photographing method in this embodiment is described as follows:

101. Acquire to-be-photographed first content.

102. After determining a first subject with which a user is concerned in the first content, acquire an image composition relationship between a second subject in the first content and the first subject, where the second subject is a background subject in the first content except the first subject.

For example, the first subject may be a partial close-up of a building, a partial close-up of a landscape, a person, multiple persons, an area in a range, or a river, a section of path, or the like.

If the first subject is a river, trees around the river, and the like are all the background subject.

It should be noted that the first subject in this embodiment may be multiple areas in the first content.

103. Match the image composition relationship between the second subject and the first subject with a preset image composition template to obtain a matching evaluation degree.

The image composition relationship in this embodiment refers to a relative location relationship of the first subject in the second subject. In addition, the matching evaluation degree in this embodiment is used to indicate properness of the image composition relationship.

Currently, image composition is defined as follows: an image to be shown is properly organized according to requirements of a topic and a theme to form a harmonious and complete picture, which is referred to as image composition.

For example, the matching evaluation degree may be a qualitative evaluation such as "good", "excellent", or "poor", or may be a quantitative evaluation such as a rating of "5 points", "3 points", or "1 point".

It can be understood that matching the image composition relationship between the second subject and the first subject with a preset image composition template can be understood as location matching performed using the image composition relationship and a special line or a special point in the preset image composition template, for example, a location of an outline of the first subject in the image composition relationship is close to a golden section point in a golden section template or is not close to a golden section point in a golden section template; and if the location of the outline of the first subject in the image composition relationship is close to the golden section point in the golden section template, the matching evaluation degree is high.

Alternatively, whether a location of an outline of the first subject in the image composition relationship falls within an area formed by golden section points in a golden section template or does not fall within an area formed by golden section points in a golden section template, and if yes, the matching evaluation degree is high. Details are as those described in the following FIG. 3A to FIG. 3K.

The preset image composition template in this embodiment may be a golden section template, a compact template, a triangular image composition template, a diagonal image composition template, a vertical line image composition template, and/or a horizontal line image composition template, an asymmetric image composition template, an S-shaped image composition template, an X-shaped image composition template, or the like.

104. Provide an image composition adjustment suggestion on the first content for the user according to the matching evaluation degree and the preset image composition template, where the adjustment suggestion is a tip on how to adjust the image composition relationship in the first content, so that the image composition relationship completely matches the preset image composition template.

For example, the image composition adjustment suggestion may be given using an illustration. For example, the illustration includes an arrow indicating a direction of adjustment, a dotted box of an ideal image composition location (as shown in FIG. 3B and FIG. 3C), or the like.

In another embodiment, the image composition adjustment suggestion may also be given by means of words, or the image composition adjustment suggestion is prompted by means of a voice, or the like.

As can be learned from the foregoing embodiment, in a photographing method in this embodiment, after a first subject with which a user is concerned is determined in to-be-photographed first content, an image composition relationship between the first subject and a second subject in the first content is obtained, further, the image composition relationship is matched with a preset image composition template to obtain a matching evaluation degree, and further, an image composition adjustment suggestion on the first content is provided for the user according to the matching evaluation degree, so as to solve the problem in the prior art that in a photographing process, image composition quality of photographing cannot be determined or adjusted, which results in a poor photographing result.

For example, the foregoing step 101 to step 104 in FIG. 1 may be executed by any device with a photographing function, such as a camera, a mobile phone with a photographing function, a computer with a photographing function, or a tablet computer with a photographing function.

It can be understood that, in an actual application, a display unit of any photographing device can display to-be-photographed first content, and here the first content is framed content of the photographing device, that is, content to be photographed as a photo by the photographing device. For example, a display screen of the camera displays content seen by a lens of the photographing apparatus.

In an optional implementation manner, after step 101 of the foregoing photographing method, the photographing method may further include the following step 101a that is not shown in the drawing:

101a. The user selects the first subject of concern in the first content.

In other words, before the foregoing step 102, the determining the first subject with which the user is concerned in the first content may be that the user selects a part of content in the first content as the first subject of concern. For example, the display screen described above is a touch screen, and the user can select a subject on the touch screen as the first subject of concern. Generally, the user may select the first subject of concern by tapping, double tapping, sliding, drawing a circle, or the like.

The first subject herein may be a subject, a person, a building, or the like in the first content. In another embodiment, the first subject may further be a subject that is currently focused on by a camera and is used by default as the subject with which a user is concerned.

Figure 2A:
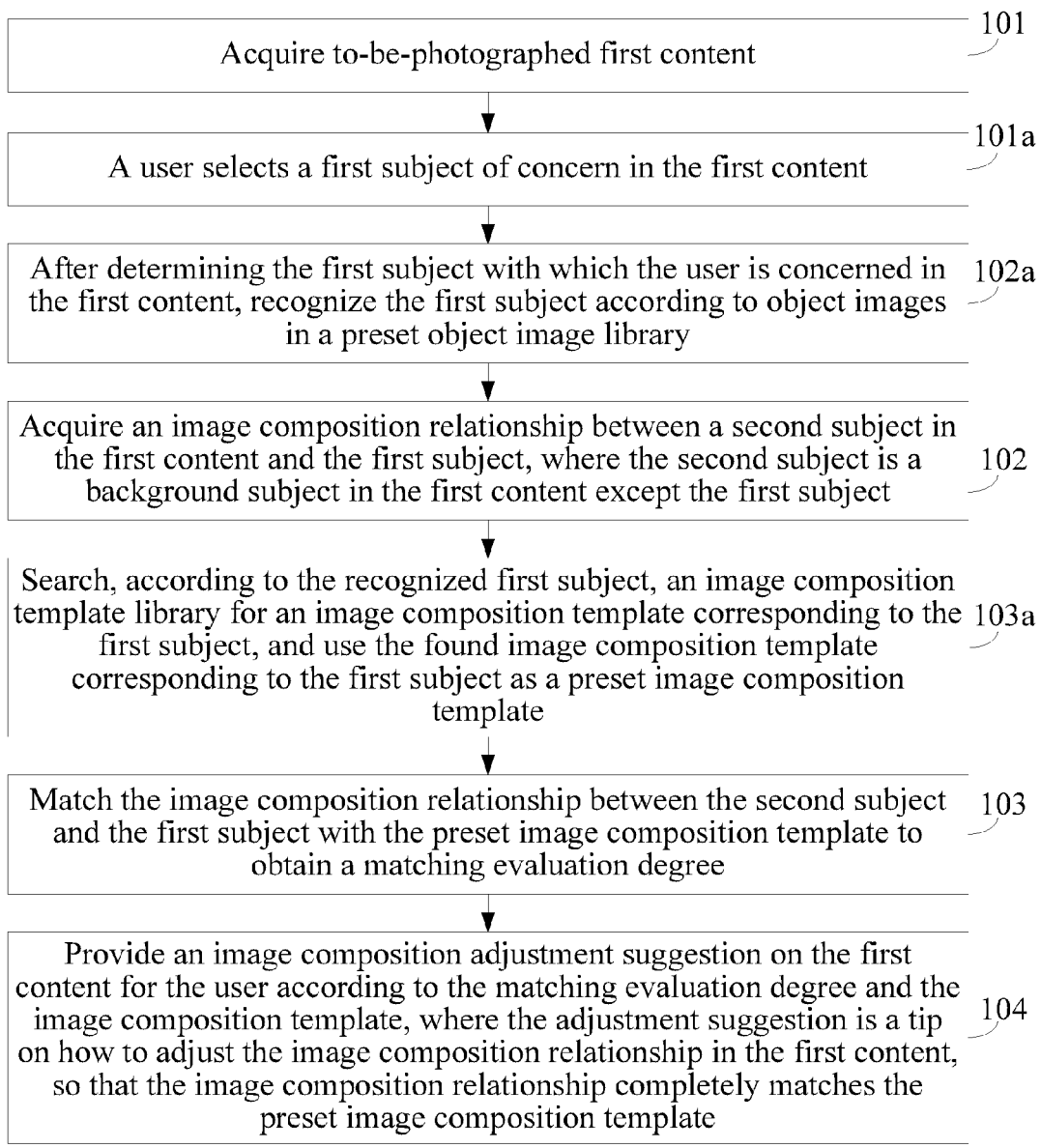
FIG. 2A is a schematic flowchart of a photographing method according to another embodiment of the present invention.

As shown in FIG. 2A, in a second optional implementation manner, before the step of "acquiring an image composition relationship between a second subject in the first content and the first subject" in step 102, the photographing method may further include the following step 102a:

102a. Recognize the first subject according to subject images in a preset subject image library.

For example, model diagrams of multiple subject images are stored in the subject image library in this embodiment, such as models of an apple, a graphic building, a river, a mountain, and a person.

Figure 2B:
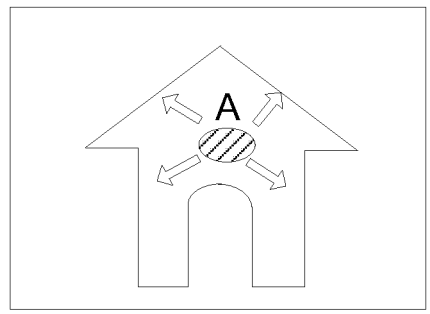
FIG. 2B is a schematic diagram of photographed content according to an embodiment of the present invention.

If the user touches the screen using a unit, the photographing device detects that the user touches a plane being an area A with a finger, and as shown in FIG. 2B, in this case, the photographing device extends the area A, which is used as a basic point, to a surrounding until an edge of the subject, that is a location where a jump occurs in a depth. In this way, the outline of the first subject is extracted, and the first subject is recognized as a person, an animal, a plant, or the like, by being compared with the subject image library.

For example, first a color quantity corresponding to each pixel is analyzed. For example, three components red (R), green (G), and blue (B) are used for representing each pixel of a color image, and each component has 8 bits. In this way, one pixel is represented using 24 bits in total, that is, the pixel depth is 24. Each pixel may be one of 16,777,216 (2 to the power of 24) colors.

Second, with gradual outward extension of pixel point analysis, when the color quantity of a related pixel greatly differs from the color quantity of a pixel that is extended outward, it is considered that it may be an outline.

Subsequently, many outlines obtained by analyzing a pixel quantity are analyzed comprehensively, and are compared with the subject image recognition library, so that what subject it is may be obtained.

Figure 2C:
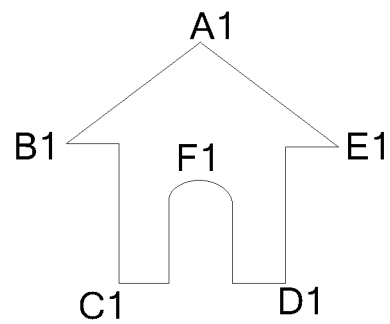
FIG. 2C is a schematic outline diagram of a first subject in FIG. 2B.
Figure 2D:
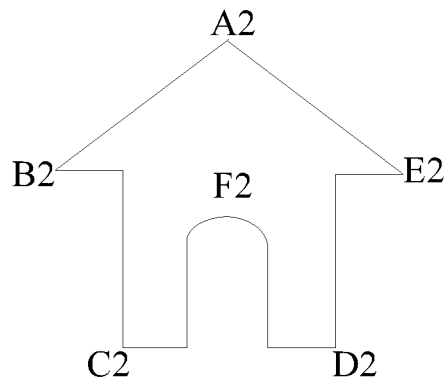
FIG. 2D is a schematic outline diagram of a subject in a subject recognition library according to an embodiment of the present invention.

As shown in FIG. 2C and FIG. 2D, FIG. 2C is a first subject with which a user is concerned in first content, and FIG. 2D is a preset subject image in a subject image library.

To compare a first image with subject images in the subject image library is: searching for some special points in the outline of the first subject (such as an angular location, or a location of a turning point), for example, A1, B1, C1, D1, and E1 in FIG. 2C. A layout feature and proportion of the first subject are analyzed according to the special points, a subject that has a layout feature with a high similarity with that of the first subject is found in the subject image library, and what the first subject is may be recognized according to a subject name in the subject image library.

Optionally, after the first subject is recognized, detailed features of the first subject may further be found by means of histogram analysis, lighting analysis, facial recognition, and the like.

103a. Search, according to the recognized first subject, an image composition template library for an image composition template corresponding to the first subject, and use the found image composition template corresponding to the first subject as a preset image composition template.

Generally, after the first subject is recognized, an image composition template corresponding to an image composition relationship between the second subject and the first subject may be selected according to a table (for example, Table 1 as follows) of preset image composition templates and subjects of concern.

TABLE 1

| First subject of concern | Image composition template |
| --- | --- |
| Partial close-up | Compact layout, and big and small layout |
| One person or subject | Golden section, and centripetal image composition |
| Two persons or subjects | Big and small, and symmetrical image composition |
| Three persons or subjects | Triangular image composition, and diagonal image composition |
| Multiple persons or subjects (high mountains, waterfalls, buildings, or the like) | Vertical line image composition, horizontal line image composition, and diagonal image composition |
| An area in a range, and a distant landscape | Golden section, and asymmetric image composition |
| A (section of) path, river, winding path, or the like | S-shaped image composition, X-shaped image composition, and diagonal image composition |

The photographing method in the foregoing embodiment can well solve the problem in the prior art that in a photographing process, image composition quality of photographing cannot be determined or adjusted, which results in a poor photographing result.

In another embodiment, step 103 and step 104 in FIG. 1 are used as an example for description.

Figure 3A:
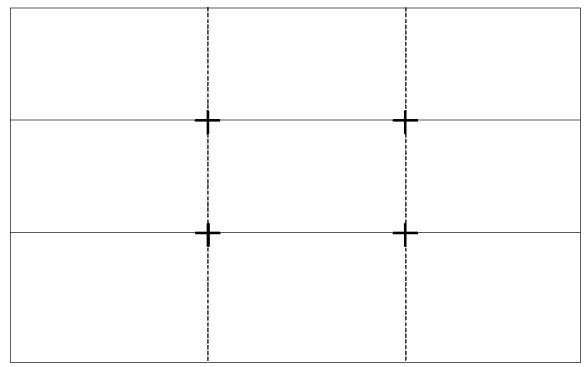
FIG. 3A is a schematic diagram of an image composition template according to an embodiment of the present invention.
Figure 3B:
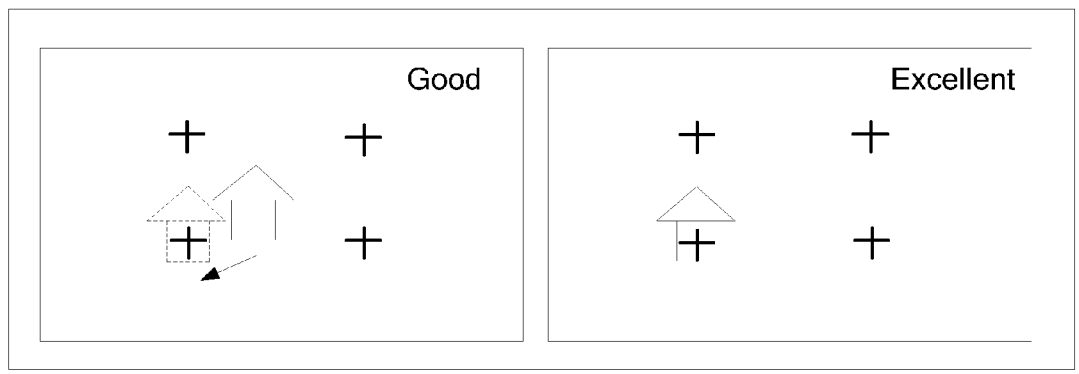
FIG. 3B to FIG. 3E are schematic diagrams of adjustment of photographed first content according to an embodiment of the present invention.
Figure 3C:
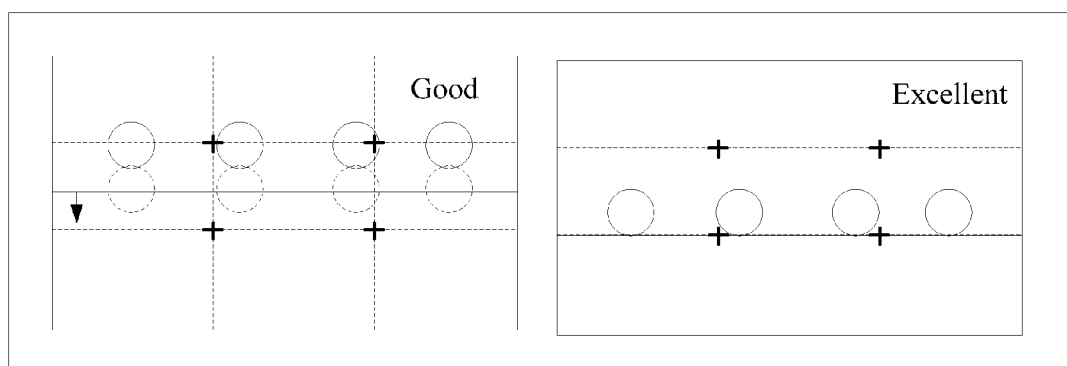

As shown in FIG. 3A, if the preset image composition template is a golden section image composition template:

In step 103, when matching the image composition relationship between the second subject and the first subject with the golden section image composition template, the photographing device analyzes relative locations of the current second subject and first subject. For example, first, the outline of the first subject of concern; second, detecting whether the outline of the first subject is close to all golden section points in the golden section image composition template (that is, whether close to four "cross" marks in FIG. 3A). If the outline of the first subject is close to all golden section points, the image composition relationship between the second subject and the first subject can obtain a high matching evaluation degree.

It can be understood that if the first subject is a range, for example, a rectangular box, the photographing device first detects whether an edge of the first subject is close to a golden section line (for example, four dotted lines in FIG. 3A). If the edge of the first subject is close to the golden section line, the image composition relationship between the second subject and the first subject has a high matching evaluation degree.

In step 104, the image composition adjustment suggestion on the first content is provided for the user/photographer according to the matching evaluation degree and the golden section image composition template, where the adjustment suggestion is a tip on how to adjust the image composition relationship in the first content, so that the image composition relationship completely matches the preset image composition template.

In other words, as shown in FIG. 3B, the illustrated image composition adjustment suggestion may be a suggestion, given through a pointing arrow, for moving the first subject to locations of the four cross marks in FIG. 3A.

In addition, as shown in FIG. 3C, if the second subject is a range, the illustrated image composition adjustment suggestion is that the edge of the first subject be as close to the golden section line as possible.

In FIG. 3B, when the photographing device detects that a location of a house (that is, the first subject) relative to a location of the background (the second subject) is backward, and after matching the image composition relationship with the golden section image composition template, learns that the first subject in the image composition relationship is close to a lower left golden section point. After matching, comparison, and computation, the photographing device gives a matching evaluation degree, and at the same time, gives an image composition adjustment suggestion. For example, it is suggested that the location of the house in a viewfinder frame may be close to a location of the dotted line, and further, after the user performs adjustment in the viewfinder frame according to the image composition adjustment suggestion, the matching evaluation degree is updated accordingly at the same time (as shown in the right diagram in FIG. 3B).

In FIG. 3C, in the left diagram of FIG. 3C, when the photographing device detects that a horizontal plane (an edge of a range, that is, the first subject) is closer to a location of a golden section line in the golden section image composition template, after matching the image composition relationship with the golden section image composition template, the photographing device obtains that the first subject in the image composition relationship is closer to a location of a lower section line. In this case, after matching, comparison, and computing, a matching evaluation degree is given, and further, an image composition adjustment suggestion is given, where the image composition adjustment suggestion may be an illustrated suggestion, which suggests that the user adjust framing according to a direction of the dotted line. After the user adjusts the framing according to the image composition adjustment suggestion, the matching evaluation degree is refreshed immediately, as shown in the right diagram of FIG. 3C.

Figure 3D:
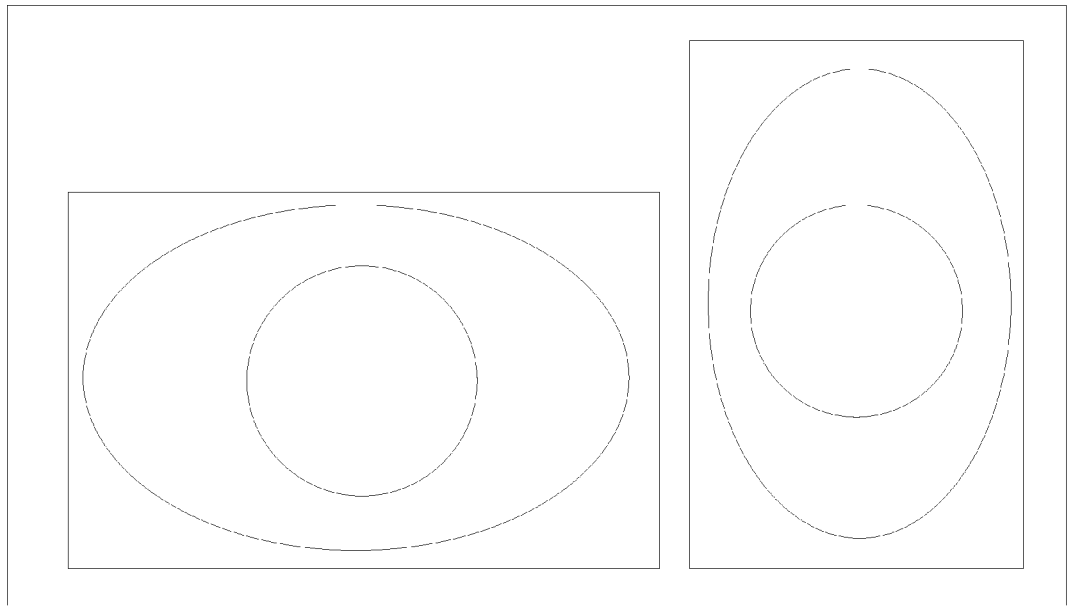

In another embodiment, as shown in the left diagram or the right diagram of FIG. 3D, the preset image composition template may be a compact image composition template.

When the photographing device matches the image composition relationship between the second subject and the first subject with the compact image composition template, if the first subject stands out as a whole relative to the location the second subject, and is close to a central area of the first content, a relative rating, of the matching evaluation degree, provided by the photographing device is high.

In this case, when the image composition adjustment suggestion is given in step 104, it may be suggested, using an illustration, that the first subject is better placed in the central area, and the edge of the first subject better fill the picture, enabling the picture to be rich in compact, delicate, and microcosmic features.

Figure 3E:
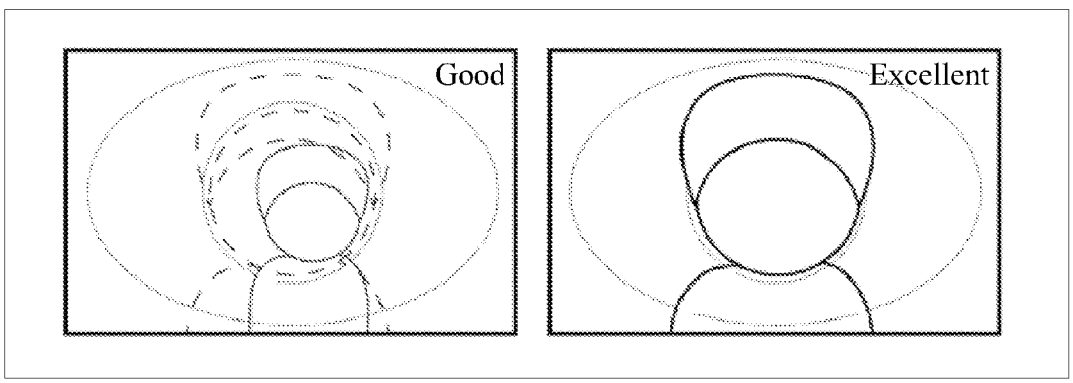

If the photographing device detects that a partial close-up of a human face (that is, the first subject) relative to the entire image composition background is backward, the photographing device matches the image composition relationship with the compact image composition template, and learns that a location of the human face in the screen is not far from a location of a central subject, but is not very full, and therefore a rating of the matching evaluation degree of the first content is medium, as shown in the left diagram of FIG. 3E.

In this case, the image composition adjustment suggestion provided in step 104 may suggest, using an illustration, that a location of the close-up of the portrait cover more in a central area of the subject, and other elements of the portrait cover an outer edge area as much as possible. After the user/photographer adjusts the location of the first subject, the rating of the matching evaluation degree is refreshed immediately, as shown in the right diagram of FIG. 3E.

Figure 3F:
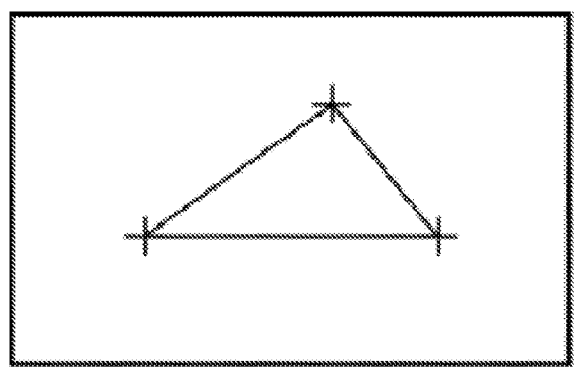
FIG. 3F is a schematic diagram of an image composition template according to another embodiment of the present invention.

As shown in FIG. 3F, in a third embodiment, the preset image composition template may be a triangular image composition template. When the photographing device matches the image composition relationship between the second subject and the first subject with the triangular image composition template, the photographing device analyzes whether three outlines of the image composition relationship between the first subject and the second subject form a triangle in a center of a framed picture.

If the three outlines of the image composition relationship between the first subject and the second subject form a rich triangle in the center of the framed picture, a better matching evaluation degree is obtained.

Figure 3G:
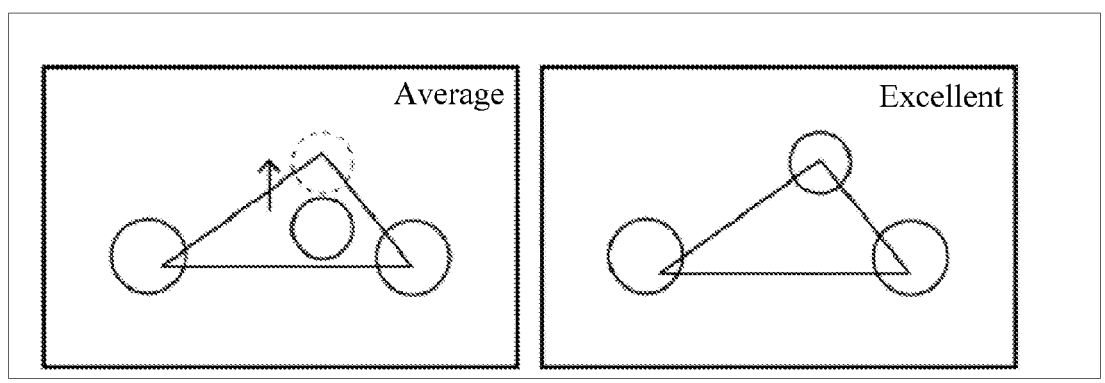
FIG. 3G is a schematic diagram of adjustment of photographed first content according to another embodiment of the present invention.

In FIG. 3G, when three points of interest of the image composition relationship between the first subject (the subject of concern) and the second subject (the background subject) are three little balls, the image composition relationship is matched with the triangular image composition template.

The triangle in the left diagram of FIG. 3G (the image composition relationship between the first subject and the second subject) is not balanced enough, and therefore, a point value of the matching evaluation degree is a rating of "ordinary".

Accordingly, in step 104, the image composition adjustment suggestion may suggest, using an illustration, that a location of a little ball behind move slightly upwards to form a fuller and more balanced image composition relationship. After the user/photographer adjusts framing of the first content, the rating of the matching evaluation degree in step 103 is refreshed immediately. As shown in the right diagram of FIG. 3G, the user raises a location for framing, and achieves an effect that three balls form a triangle, so that the whole image composition is more balanced and stable.

Figure 3H:
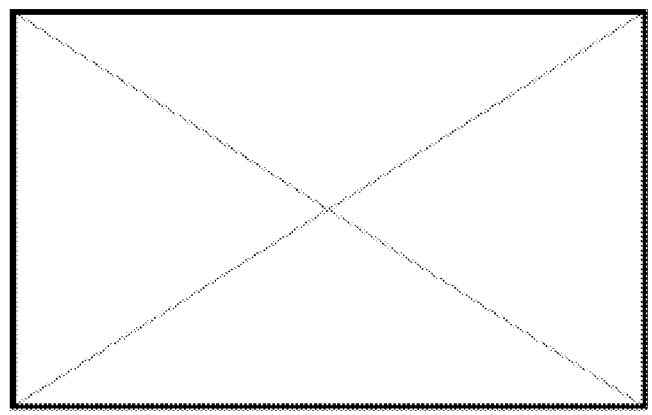
FIG. 3H is a schematic diagram of an image composition template according to another embodiment of the present invention.

As shown in FIG. 3H, in a fourth embodiment, the preset image composition template may be a diagonal image composition template.

When a photographing device matches the image composition relationship between the second subject and the first subject with a diagonal image composition template, the photographing device analyzes whether the image composition relationship between the first subject and the second subject is in two diagonal lines, and if an angle between the first subject in the image composition relationship and one of the diagonal lines is smaller, an obtained rating of the matching evaluation degree is higher, and the image composition adjustment suggestion obtained in step 104 may suggest that the user adjust a framing angle of the first content.

After the first content is adjusted according to the image composition adjustment suggestion corresponding to the diagonal image composition template, the photographed first content is made to seem stereoscopic, extended, and dynamic.

Figure 3I:
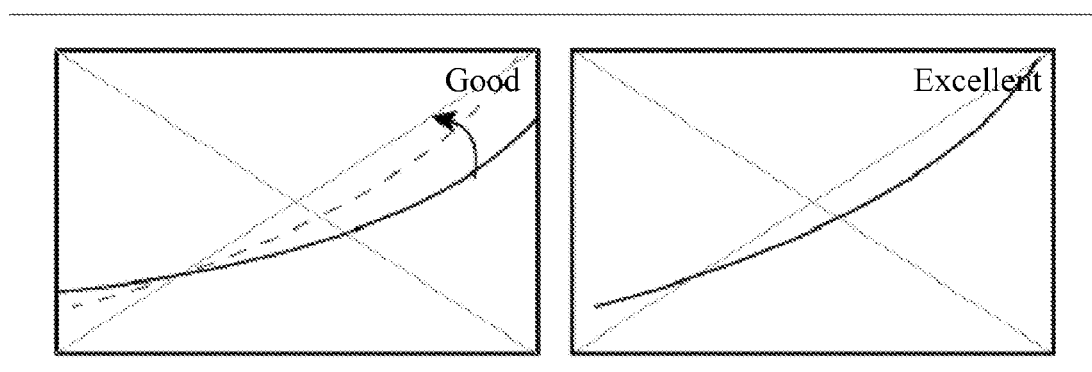
FIG. 3I is a schematic diagram of adjustment of photographed first content according to another embodiment of the present invention.

As shown in the left diagram of FIG. 3I, when the subject of concern (that is, the first subject) is a river, the photographing device generally chooses to match the image composition relationship between the first subject and the second subject with the diagonal image composition template. When it is found after matching that a path of the river is closer to a diagonal line from the lower left to the upper right, the matching evaluation degree is given a good rating, and in step 104, the image composition adjustment suggestion may suggest, using an illustration, that the path of the river be slightly rotated and adjusted to the closer diagonal line. After the user rotates the framing of the first content for adjustment, the rating of the matching evaluation degree is refreshed immediately, as shown in the right diagram of FIG. 3I.

Figure 3J:
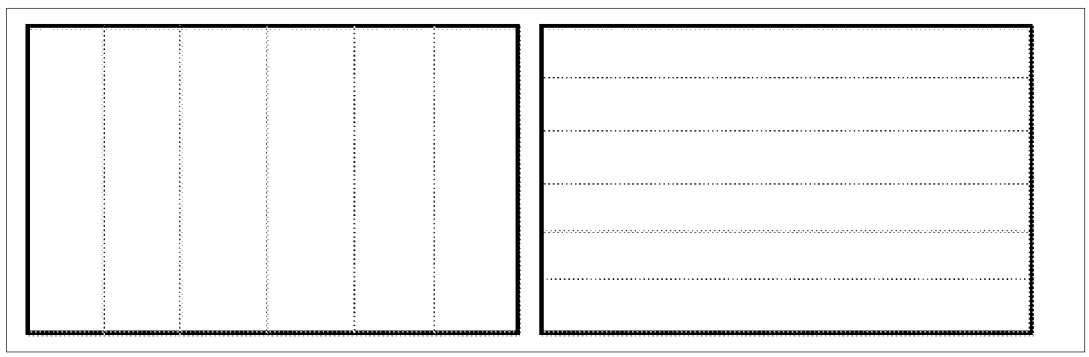
FIG. 3J is a schematic diagram of an image composition template according to another embodiment of the present invention.

As shown in the left diagram of FIG. 3J, in a fifth embodiment, the preset image composition template may be a vertical line image composition template. The right diagram of FIG. 3J shows a horizontal line image composition template.

When a photographing device matches an image composition relationship between a second subject and a first subject with a vertical line image composition template, the photographing device analyzes that a subject of concern (that is, the first subject) and a background subject (the second subject) are in parallel vertical lines. When the first subject and the second subject are closer to the parallel vertical lines (or a horizontal line) and filling is full, the relative rating of the matching evaluation degree is higher, and in step 104, the image composition adjustment suggestion may suggest, using an illustration, that the user adjust an angle of first content to be vertical. Generally, a vertical line image composition gives a person a visual perception of steadiness, balance, and reliability.

Figure 3K:
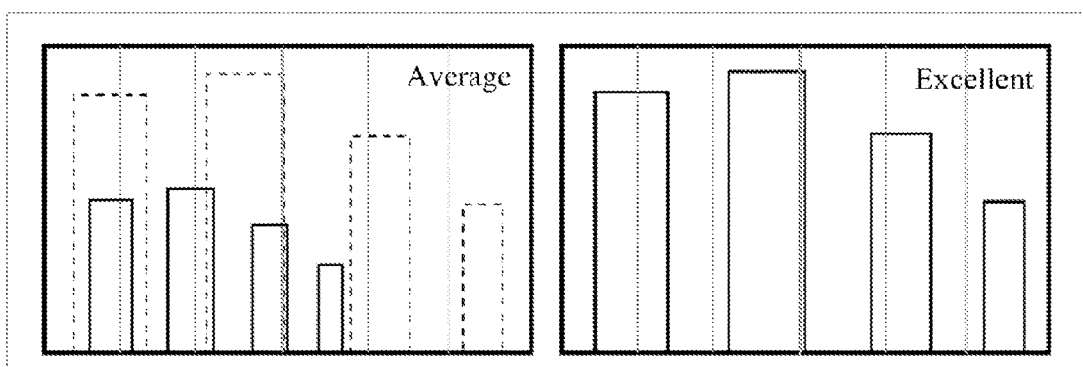
FIG. 3K is a schematic diagram of adjustment of photographed first content according to another embodiment of the present invention.

As shown in the left diagram of FIG. 3K, when the subject of concern is a group of buildings, it is found after matching that the group of buildings are all in parallel vertical lines, but the content is far from being full, and therefore, the rating of the matching evaluation degree gives an ordinary rating, and in step 104, the image composition adjustment suggestion may suggest, using an illustration, that the user adjust a focal length to make the group of buildings look fuller in a picture; and further, the user adjusts the focal length or approaches to adjust the framing of the first content, the rating of the matching evaluation degree is refreshed accordingly, as shown in the right diagram of FIG. 3K.

In addition to the foregoing exemplified templates, the image composition template may be an S-shaped image composition template, an X-shaped image composition template, a centripetal image composition (a radially accumulated points image composition) template, a big and small template, a symmetrical and asymmetric image composition template, or the like.

A photographing method in this embodiment can enable a user to directly obtain image composition quality of a photo and obtain an image composition adjustment suggestion on to-be-photographed first content, and after the user adjusts the first content according to the image composition adjustment suggestion, the problem of poor photographing quality in the prior art can be effectively solved.

Second Embodiment

Figure 4A:
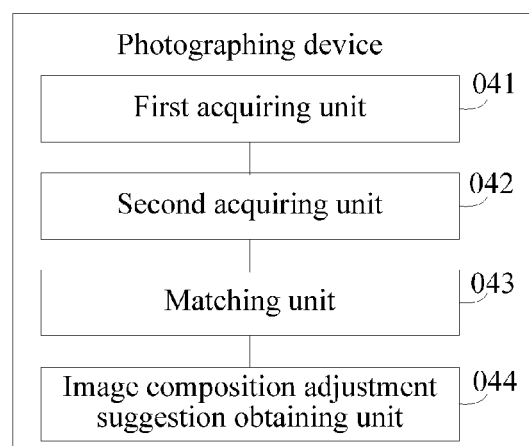
FIG. 4A and FIG. 4B are schematic structural diagrams of a photographing device according to an embodiment of the present invention.

An embodiment of the present invention provides a photographing device, and as shown in FIG. 4A the photographing device in this embodiment includes: a first acquiring unit 041, a second acquiring unit 042, a matching unit 043, and an image composition adjustment suggestion obtaining unit 044, where the first acquiring unit 041 is configured to acquire to-be-photographed first content; the second acquiring unit 042 is configured to, after the first acquiring unit 041 acquires the first content, and after a first subject with which a user is concerned in the first content is determined, acquire an image composition relationship between a second subject in the first content and the first subject, where the second subject is a background subject in the first content except the first subject; the matching unit 043 is configured to, after the second acquiring unit 042 acquires the image composition relationship, match the image composition relationship between the second subject and the first subject with a preset image composition template to obtain a matching evaluation degree; and the image composition adjustment suggestion obtaining unit 044 is configured to, after the matching unit 043 obtains the matching evaluation degree, provide an image composition adjustment suggestion on the first content for the user according to the matching evaluation degree and the preset image composition template, where the adjustment suggestion is a tip on how to adjust the image composition relationship in the first content, so that the image composition relationship completely matches the preset image composition template; where the matching evaluation degree is used to indicate properness of the image composition relationship.

In an optional embodiment, the photographing device may further include a first subject selection unit 045 which is not shown in the drawing, where the first subject selection unit 045 is configured to, after the first acquiring unit 041 acquires the first content, select, by the user, the first subject of concern in the first content.

In another optional embodiment, the photographing device may further include a recognition unit 046 and an image composition template selection unit 047 which are not shown in the drawing, where the recognition unit 046 is configured to, after the first acquiring unit 041 acquires the first content, and after the first subject with which the user is concerned in the first content is determined, recognize the first subject according to a subject image in a preset subject image library; and the image composition template selection unit 047 is configured to, after the recognition unit 046 recognizes the first subject, search, according to the recognized first subject, an image composition template library for an image composition template corresponding to the first subject, and use the found image composition template corresponding to the first subject as a preset image composition template.

The photographing device in the foregoing embodiment can solve the problem in the prior art that in a photographing process, image composition quality of photographing cannot be determined or adjusted, which results in a poor photographing result.

Figure 4B:
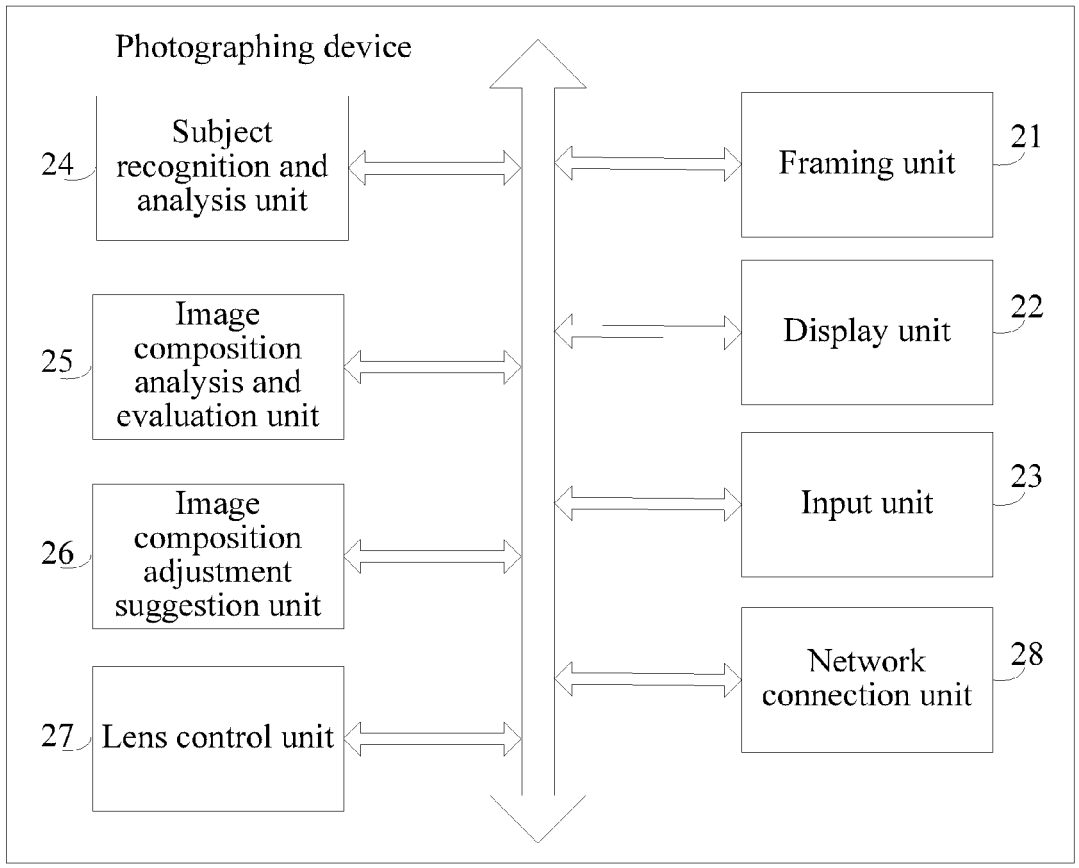
Figure 4C:
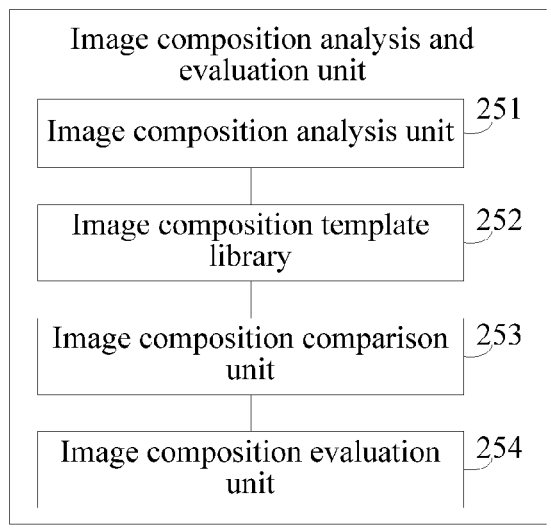
FIG. 4C is a schematic diagram of a partial structure of a photographing device according to another embodiment of the present invention.

In a third optional implementation manner, the photographing device in this embodiment may include the following functional units. As shown in FIG. 4B, the photographing device includes: a framing unit 21, a display unit 22, an input unit 23, a subject recognition and analysis unit 24, an image composition analysis and evaluation unit 25, an image composition adjustment suggestion unit 26, a lens control unit 27, and a network connection unit 28, where the framing unit 21 is configured to pre-frame first content to be photographed by a user, and output the to-be-photographed first content to the display unit 22 for display, where in a specific application, the framing unit 21 may include a lens, a light sensor, and the like; the display unit 22 is configured to display the first content to-be-photographed by the user, and may further be configured to display an image composition adjustment suggestion, and the like; the input unit 23 is configured to receive a choice input by the user, and select a first subject with which the user is concerned, where the input unit 23 may be various touch sensitive screens, for example, a capacitive sensing screen, a microwave sensing screen, a non-contact control output apparatus, and the like; and the input unit 23 may further be replaced by a focal point analysis unit, and focused content in the to-be-photographed first content is set by default as the subject with which the user is concerned; the subject recognition and analysis unit 24 is configured to analyze and extract the first subject with which the user is concerned, and is configured to analyze and recognize another background subject; and the subject recognition and analysis unit 24 may further be configured to analyze detailed features of the first subject, such as color information, body type, and vagueness of an outline; the image composition analysis and evaluation unit 25 is configured to determine an image composition relationship between the first subject and a second subject, and make comparison and analysis to give an image composition quality evaluation according to a pre-stored image composition template; and the image composition analysis and evaluation unit 25 further includes an image composition analysis unit 251, an image composition template library 252, an image composition comparison unit 253, an image composition evaluation unit 254, and the like, as shown in FIG. 4C.

The image composition analysis unit 251 is configured to give an image composition relationship between a subject of concern (the first subject) and a background subject (the second subject), select a proper image composition template, and the like.

The image composition template library 252 is a knowledge base of image composition templates, and the image composition template library may be stored in a photographing apparatus locally, or may be placed in the cloud using a network. Certainly, the image composition analysis unit 251 may also be implemented entirely in the cloud. The image composition template library includes various image composition templates such as the examples described above.

The image composition comparison unit 253 is configured to compare the existing image composition relationship between the first subject and the second subject in the first content, and a process of matching the image composition relationship and the image composition template, and analyze a matching evaluation degree.

The image composition evaluation unit 254 is configured to give an evaluation of the matching evaluation degree after the analysis by the image composition comparison unit 253.

The image composition adjustment suggestion unit 26 is configured to give an image composition adjustment suggestion according to the analysis by the image composition analysis and evaluation unit 25, where the image composition adjustment suggestion may be given using an illustration, words, a voice prompt, or the like. If the image composition adjustment suggestion is an illustrated suggestion, the suggestion may include an arrow indicating a direction of adjustment, or give a dotted box of an ideal image composition location, or the like.

In a specific application, the photographing device may further include a lens control unit 27 configured to control, according to the adjustment suggestion output by the image composition adjustment suggestion unit 26, a lens to adjust image composition, where the lens control unit may include a lens adjustment control signal generating unit and a lens control adjustment execution unit (not shown in the drawing), and for example, the lens control unit 27 may be a servo motor, where the servo motor may include a front and back adjustment motor, and may also include a left and right adjustment motor, an up and down adjustment motor, and the like.

For example, the image composition adjustment suggestion unit 26 outputs an image composition adjustment suggestion to the lens control unit 27, and the lens control unit 27 adjusts the lens to make the image composition better match the image composition template, so as to improve the image composition quality. FIG. 3K is used as an example. The image composition adjustment suggestion unit 26 outputs a suggestion for zooming in the first subject of concern (a group of buildings), and the lens control unit 27 outputs a control instruction, for example, the servo motor adjusts the lens to zoom in the first subject of concern, so as to implement more flexible image composition adjustment.

In another implementation manner, the foregoing photographing device may further include a network connection unit 28 configured to connect to a network, for example, when in a network cloud, the image composition analysis and evaluation unit 25 or the image composition template library may be connected to the network using the network connection unit 28 to implement a photographing system formed by both the photographing device and the network, and a function of image composition analysis, evaluation, and suggestion is implemented, where the network connection unit 28 may be a wireless cellular system, and may be a wireless fidelity (WiFi) wireless connection unit, a wired network connection, or the like.

The foregoing photographing device can give an image composition quality evaluation, so that the user obtains in a timely manner a prompt for adjusting the image composition, and obtains a suggestion for optimizing the image composition, so that the user can adjust in a timely manner the image composition to take a photo of better quality.

Third Embodiment

Figure 5:
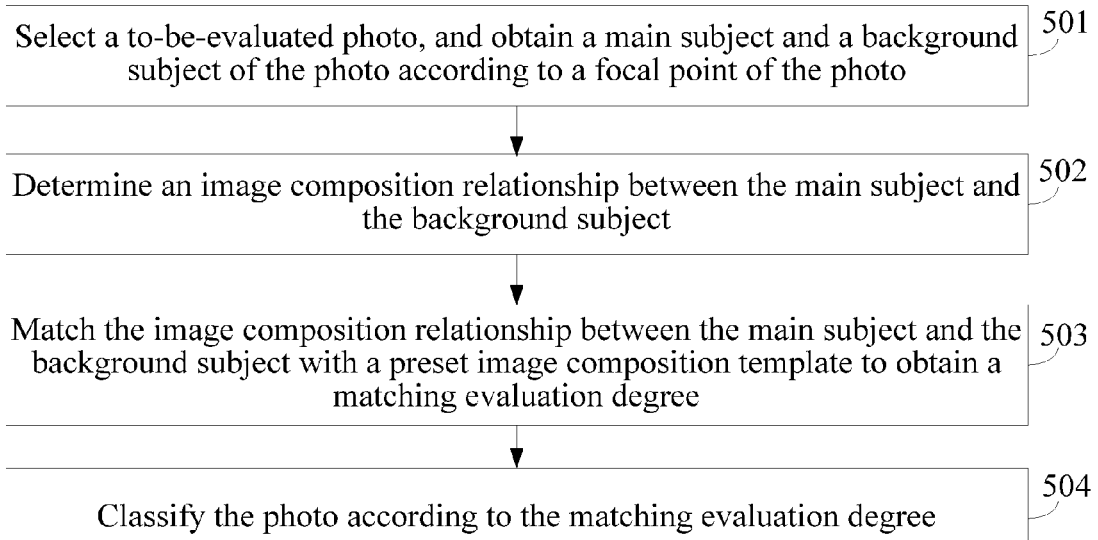
FIG. 5 is a schematic flowchart of a photo management method according to an embodiment of the present invention.

FIG. 5 shows a photo management method according to an embodiment of the present invention. As shown in FIG. 5, the photo management method in this embodiment is described as follows:

501. Select a to-be-evaluated photo, and obtain a main subject and a background subject of the photo according to a focal point of the photo.

In another embodiment, a user may input in advance a to-be-evaluated photo.

502. Determine an image composition relationship between the main subject and the background subject.

503. Match the image composition relationship between the main subject and the background subject with a preset image composition template to obtain a matching evaluation degree.

In this embodiment, the matching evaluation degree is used to indicate properness of the image composition relationship.

For example, an image composition relationship between a subject of concern and another background subject is analyzed and determined, and is matched with an image composition template in an image composition template library, and a matching evaluation degree of current image composition by a user is given according to a matching degree.

Alternatively, according to features of the main subject, a preferential image composition template is selected for matching, to obtain the matching evaluation degree.

The matching evaluation degree may be a qualitative evaluation such as "good", "excellent", or "poor", or may be a quantitative evaluation such as a rating of "5 points", "3 points", or "1 point".

Further, a reason for the evaluation may be given, for example, similar to "the head is incomplete", "the person is too small", or the like.

Moreover, the preset image composition template may be a golden section image composition template, a compact image composition template, a triangular image composition template, a diagonal image composition template, a vertical line image composition template, a horizontal line image composition template, or the like.

504. Classify the photo according to the matching evaluation degree.

For example, a photo evaluated to be good or better is put into a folder, and a photo evaluated to be poor is put into a folder.

Further, a prompt to the user on whether to delete a photo with poor quality may be included. If the user confirms yes, photos of poor image composition quality may be deleted in batches.

It can be seen from the foregoing embodiment that, in a photographing management method in this embodiment, an image composition relationship between a main subject and a background subject in a to-be-evaluated photo is analyzed, an image composition template is further selected, and a matching evaluation degree of the to-be-evaluated photo is acquired, so that the problem in the prior art that a photo cannot be automatically recognized and managed can be solved.

Fourth Embodiment

Figure 6A:
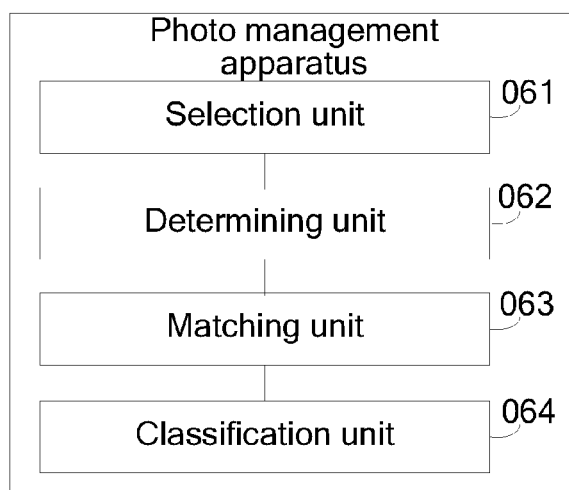
FIG. 6A and FIG. 6B are schematic structural diagrams of a photo management apparatus according to an embodiment of the present invention.

FIG. 6A is a schematic structural diagram of a photographing management apparatus according to an embodiment of the present invention. As shown in FIG. 6, the photo management apparatus in this embodiment includes: a selection unit 061, a determining unit 062, a matching unit 063, and a classification unit 064, where the selection unit 061 is configured to select a to-be-evaluated photo, and obtain a main subject and a background subject of the photo according to a focal point of the photo; the determining unit 062 is configured to, after the selection unit 061 obtains the main subject, determine an image composition relationship between the main subject and the background subject; the matching unit 063 is configured to, after the determining unit 062 determines the image composition relationship, match the image composition relationship between the main subject and the background subject with a preset image composition template to obtain a matching evaluation degree; and the classification unit 064 is configured to, after the matching unit 063 obtains the matching evaluation degree, classify the photo according to the matching evaluation degree, where the matching evaluation degree is used to indicate properness of the image composition relationship.

A photo management apparatus in this embodiment can automatically recognize a photo with poor image composition quality, and classify and manage photos with poor quality, thereby solving the problem in the prior art that a user needs to recognize the photos one by one and processing efficiency is not high.

Figure 6B:
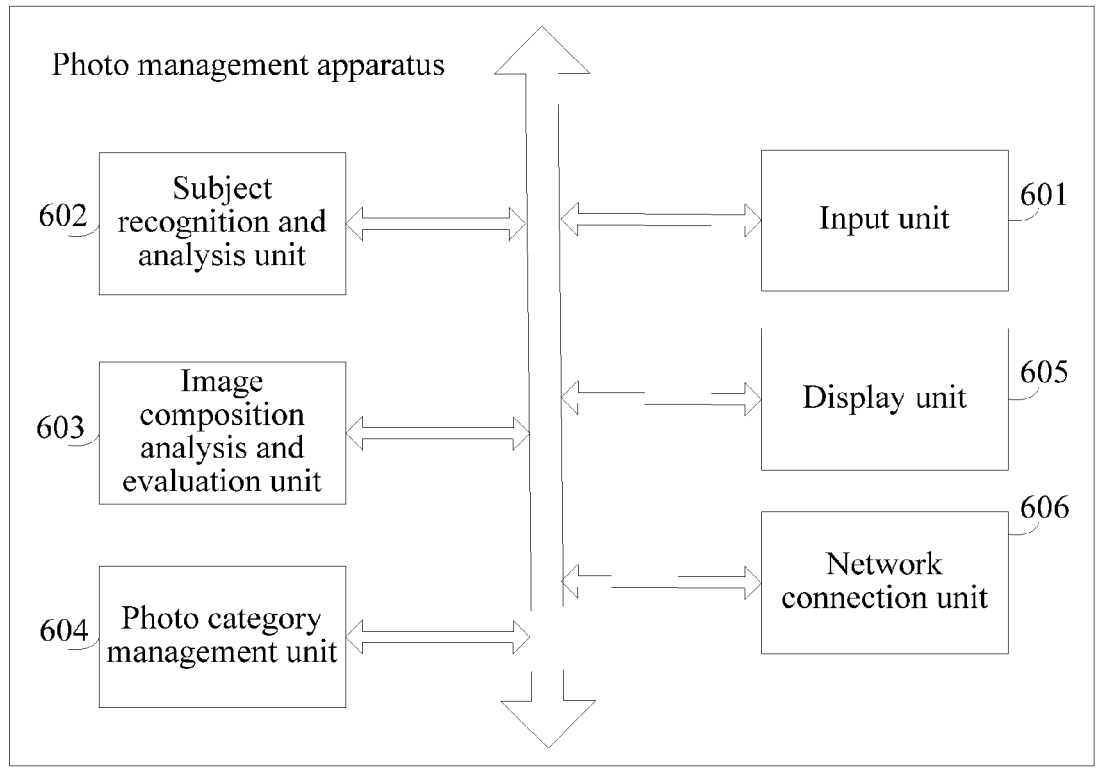
Figure 6C:
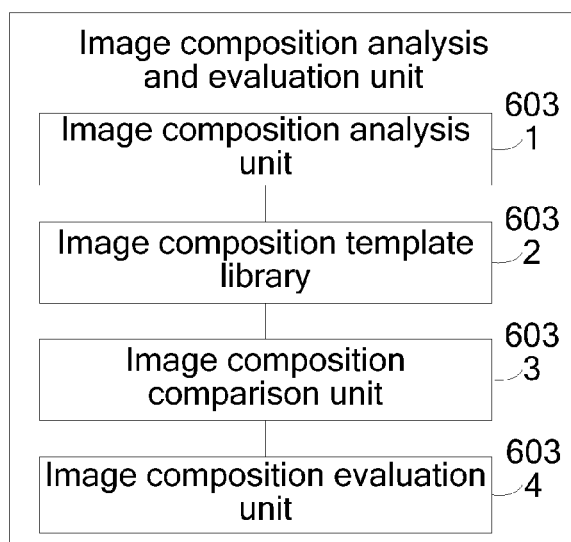
FIG. 6C is a schematic diagram of a partial structure of a photo management apparatus according to an embodiment of the present invention.

In another embodiment, FIG. 6B is a schematic structural diagram of a photo management apparatus according to an embodiment of the present invention. As shown in FIG. 6B, the photo management apparatus in this embodiment includes: an input unit 601, a subject recognition and analysis unit 602, an image composition analysis and evaluation unit 603, a photo category management unit 604, a display unit 605, and a network connection unit 606, where the input unit 601 is configured to receive an input photo on which image composition evaluation and analysis are to be performed; the subject recognition and analysis unit 602 is configured to analyze, extract, and recognize a main subject in the photo, and configured to analyze and recognize another background subject; for example, a subject located at a clearest focal point of the photo is determined as the main subject; and the subject recognition and analysis unit 602 may further be configured to analyze detailed features of a main subject, such as color information, body type, and vagueness of an outline; the image composition analysis and evaluation unit 603 is configured to determine an image composition relationship between a subject of concern and a background subject, and make comparison and analysis to give an image composition quality evaluation according to a pre-stored image composition template; and the image composition analysis and evaluation unit 603 may further include an image composition analysis unit 6031, an image composition template library 6032, an image composition comparison unit 6033, an image composition evaluation unit 6034, and the like, as shown in FIG. 6C.

The image composition analysis unit 6031 is configured to give the image composition relationship between the subject of concern and the background subject, select a proper image composition template, and the like.

The image composition template library 6032 is a knowledge base of image composition templates, and the image composition template library may be stored in the photo management apparatus locally, or may be placed in the cloud using a network. Certainly, the entire image composition analysis unit may be implemented in the cloud. The image composition template library includes various image composition templates such as the examples described above.

The image composition comparison unit 6033 is configured to compare the image composition relationship between the subject of concern and the background subject with the image composition template.

The image composition evaluation unit 6034 is configured to give a matching evaluation degree according to the analysis by the image composition comparison unit.

The photo category management unit 604 is configured to, according to an evaluation result by the image composition evaluation unit, determine a quality category of a photo, and perform category management.

Further, the photo management apparatus may include a display unit 605 configured to output and display a classification result; and may further give a reason for the classification, give a prompt on whether a photo with poor quality is to be deleted, and the like.

The photo management apparatus may further include a network connection unit 606 configured to connect to the network, for example, when the image composition analysis and evaluation unit or the image composition template library is in the network cloud, it may connect to the network using a network connection unit, thereby implementing that this machine forms a photographing system together with the network. The image composition analysis is implemented. The network connection unit 606 may be a wireless cellular system, may be a WiFi wireless connection unit, or is a wired network connection.

By determining photo image composition quality, a photo management apparatus of this embodiment automatically recognizes a photo with poor quality, and classifies and manages photos with poor quality, thereby solving the problem in the prior art that a smart camera cannot automatically manage a photo.

Figure 7:
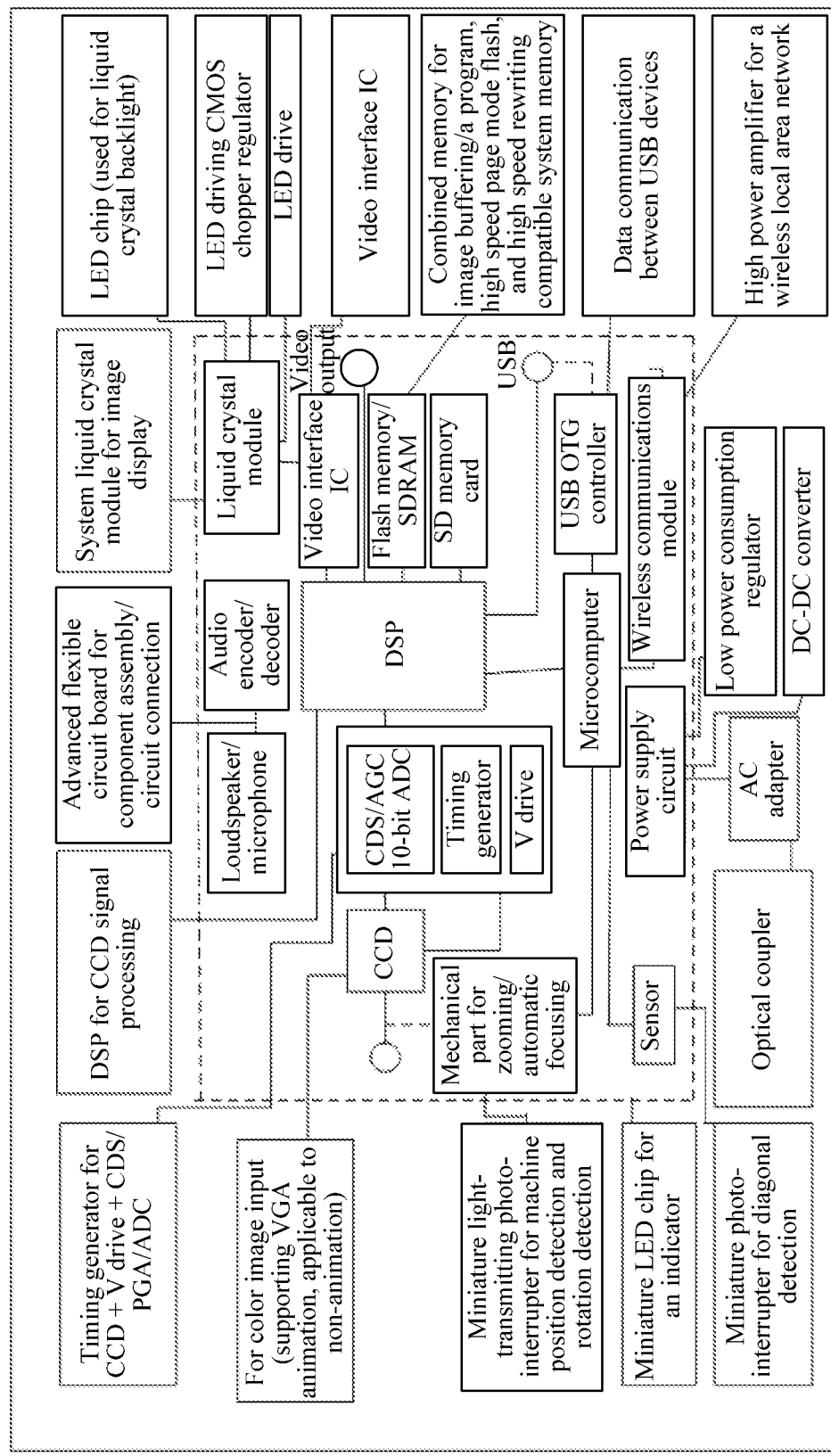
FIG. 7 is a schematic structural diagram of a photographing device according to an embodiment of the present invention.

FIG. 7 is a schematic structural diagram of a photographing device according to an embodiment of the present invention. The foregoing photographing device in FIG. 4A may be of a structure shown in FIG. 7.

Certainly, in an actual application, the photographing device may also have a function of the photo management apparatus. Therefore, the photo management apparatus shown in FIG. 6A or FIG. 6B may be a part of the photographing device.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A photographing method, comprising:
   acquiring to-be-photographed first content;
   acquiring an image composition relationship between a second subject in the first content and the first subject after determining a first subject with which a user is concerned in the first content, wherein the second subject is a background subject in the first content except the first subject;
   matching the image composition relationship between the second subject and the first subject with a preset image composition template to obtain a matching evaluation degree; and
   providing an image composition adjustment suggestion on the first content for the user according to the matching evaluation degree and the preset image composition template, wherein the adjustment suggestion is a tip on how to adjust the image composition relationship in the first content so that the image composition relationship completely matches the preset image composition template, and wherein the matching evaluation degree is used to indicate properness of the image composition relationship.

2. The method according to claim 1, wherein before acquiring the image composition relationship between the second subject in the first content and the first subject, the method further comprises receiving the first subject of concern in the first content selected by the user.

3. The method according to claim 1, wherein before acquiring the image composition relationship between the second subject in the first content and the first subject, the method further comprises recognizing the first subject according to subject images in a preset subject image library, and wherein before matching the image composition relationship between the second subject and the first subject with the preset image composition template, the method further comprises:
   searching, according to the recognized first subject, an image composition template library for an image composition template corresponding to the first subject; and
   using the found image composition template corresponding to the first subject as the preset image composition template.

4. A photographing device, comprising:
   a first acquiring unit configured to acquire to-be-photographed first content;
   a second acquiring unit configured to: acquire an image composition relationship between a second subject in the first content and the first subject after the first acquiring unit acquires the first content, and after a first subject with which a user is concerned in the first content is determined, wherein the second subject is a background subject in the first content except the first subject;
   a matching unit configured to match the image composition relationship between the second subject and the first subject with a preset image composition template to obtain a matching evaluation degree after the second acquiring unit acquires the image composition relationship; and
   an image composition adjustment suggestion obtaining unit configured to provide an image composition adjustment suggestion on the first content for the user according to the matching evaluation degree and the preset image composition template after the matching unit obtains the matching evaluation degree, wherein the adjustment suggestion is a tip on how to adjust the image composition relationship in the first content so that the image composition relationship completely matches the preset image composition template, and wherein the matching evaluation degree is used to indicate properness of the image composition relationship.

5. The photographing device according to claim 4, further comprising a first subject selection unit configured to receive the first subject of concern in the first content selected by the user after the first acquiring unit acquires the first content.

6. The photographing device according to claim 4, further comprising:
   a recognition unit configured to recognize the first subject according to subject images in a preset subject image library after the first acquiring unit acquires the first content, and after the first subject with which the user is concerned in the first content is determined; and
   an image composition template selection unit configured to search, according to the recognized first subject, an image composition template library for an image composition template corresponding to the first subject, and use the found image composition template corresponding to the first subject as the preset image composition template after the recognition unit recognizes the first subject.

7. A photo management method, comprising:
   selecting a to-be-evaluated photo;
   obtaining a main subject and a background subject of the photo according to a focal point of the photo;

determining an image composition relationship between the main subject and the background subject;

matching the image composition relationship between the main subject and the background subject with a preset image composition template to obtain a matching evaluation degree; and classifying the photo according to the matching evaluation degree, wherein the matching evaluation degree is used to indicate properness of the image composition relationship.

8. A photo management apparatus, comprising:
   a selection unit configured to select a to-be-evaluated photo, and obtain a main subject and a background subject of the photo according to a focal point of the photo;
   a determining unit configured to determine an image composition relationship between the main subject and the background subject after the selection unit obtains the main subject;
   a matching unit configured to match the image composition relationship between the main subject and the background subject with a preset image composition template to obtain a matching evaluation degree after the determining unit determines the image composition relationship; and
   a classification unit configured to classify the photo according to the matching evaluation degree after the matching unit obtains the matching evaluation degree, wherein the matching evaluation degree is used to indicate properness of the image composition relationship.

9. A photographing device, comprising:
   a framing unit configured to pre-frame first content to be photographed by a user, and output the to-be-photographed first content to a display unit for display;
   the display unit configured to display the first content to-be-photographed by the user;
   an input unit configured to receive a choice input by the user, to select a first subject with which the user is concerned;
   a subject recognition and analysis unit configured to analyze and extract the first subject with which the user is concerned, and configured to analyze and recognize a second subject;
   an image composition analysis and evaluation unit configured to determine an image composition relationship between the first subject and the second subject, and make comparison and analysis to give an image composition quality evaluation according to a pre-stored image composition template; and
   an image composition adjustment suggestion unit configured to give an image composition adjustment suggestion according to the analysis by the image composition analysis and evaluation unit.

10. The photographing device according to claim 9, wherein the display unit is further configured to display an image composition adjustment suggestion.

11. The photographing device according to claim 9, wherein the photographing device further comprises a lens control unit configured to control, according to the adjustment suggestion output by the image composition adjustment suggestion unit, a lens to adjust image composition.

12. The photographing device according to claim 9, wherein the photographing device further comprises a network connection unit configured to connect to a network.

13. A photographing device, comprising:
   a framing unit configured to pre-frame first content to be photographed by a user, and output the to-be-photographed first content to a display unit for display;
   the display unit configured to display the first content to-be-photographed by the user;
   a focal point analysis unit configured to set focused content in the to-be-photographed first content by default as a first subject with which the user is concerned;
   a subject recognition and analysis unit configured to analyze and extract the first subject with which the user is concerned, and is configured to analyze and recognize a second subject;
   an image composition analysis and evaluation unit configured to determine an image composition relationship between the first subject and the second subject, and make comparison and analysis to give an image composition quality evaluation according to a pre-stored image composition template; and
   an image composition adjustment suggestion unit configured to give an image composition adjustment suggestion according to the analysis by the image composition analysis and evaluation unit.

14. A photo management apparatus, comprising:
   an input unit configured to receive an input photo;
   a subject recognition and analysis unit configured to analyze, extract, and recognize a subject of concern in the photo, and configured to analyze and recognize a background subject;
   an image composition analysis and evaluation unit configured to determine an image composition relationship between the subject of concern and the background subject, and make comparison and analysis to give an image composition quality evaluation according to a pre-stored image composition template; and
   a photo category management unit configured to, according to an evaluation result by the image composition analysis and evaluation unit, determine a quality category of a photo, and perform category management.

15. The photo management apparatus according to claim 14, wherein the photo management apparatus further comprises a display unit configured to output and display a classification result.

16. The photo management apparatus according to claim 15, wherein the display unit is further configured to output and display a reason for the classification, or a prompt on whether a photo with poor quality is to be deleted.

17. The photo management apparatus according to claim 14, wherein the photo management apparatus further comprises a network connection unit configured to connect to a network.

* * * * *